(12) United States Patent
Davis

(10) Patent No.: US 11,269,930 B1
(45) Date of Patent: Mar. 8, 2022

(54) TRACKING GRANULARITY LEVELS FOR ACCESSING A SPATIAL INDEX

(71) Applicant: Amazon Technologies, Inc., Seattle, WA (US)

(72) Inventor: Jeffrey Davis, Santa Clara, CA (US)

(73) Assignee: Amazon Technologies, Inc., Seattle, WA (US)

( * ) Notice: Subject to any disclaimer, the term of this patent is extended or adjusted under 35 U.S.C. 154(b) by 705 days.

(21) Appl. No.: 15/472,093

(22) Filed: Mar. 28, 2017

(51) Int. Cl.
*G06F 16/29* (2019.01)

(52) U.S. Cl.
CPC .................................. *G06F 16/29* (2019.01)

(58) Field of Classification Search
USPC .......................................................... 707/743
See application file for complete search history.

(56) References Cited

U.S. PATENT DOCUMENTS

| | | | | |
|---|---|---|---|---|
| 2004/0225433 A1* | 11/2004 | Burt | ....................... | G01C 21/26 707/E17.018 |
| 2006/0248128 A1* | 11/2006 | Acharya et al. | ........ | G06F 17/30 707/999.203 |
| 2008/0201302 A1* | 8/2008 | Kimchi | ................... | G06F 16/29 |
| 2011/0302194 A1* | 11/2011 | Gonzalez et al. | ....... | G06F 17/30 707/E17.014 |
| 2012/0203782 A1* | 8/2012 | Olston et al. | ........... | G06F 17/30 707/737 |
| 2013/0262485 A1* | 10/2013 | Li | ........................... | G06F 16/29 707/754 |
| 2017/0337229 A1* | 11/2017 | Infante Suarez et al. | ................... | G06F 17/30 |

OTHER PUBLICATIONS

Unknown, "Spatial Indexing Overview", dated Feb. 20, 2017, pp. 1-8.

* cited by examiner

*Primary Examiner* — Muluemebet Gurmu
(74) *Attorney, Agent, or Firm* — Robert C. Kowert; Kowert, Hood, Munyon, Rankin & Goetzel, P.C.

(57) ABSTRACT

A database engine may track granularity levels for accessing a spatial index. Granularity levels of a spatial index may be evaluated to identify those granularity levels that identify data objects in a data set. An indication of the identified granularity levels may be stored as part of metadata for the data set. When a spatial query directed to the data set is received, the spatial index may be accessed at the identified granularity levels indicated in the metadata for the data set as part of processing the spatial query.

20 Claims, 11 Drawing Sheets

TRACKING GRANULARITY LEVELS FOR ACCESSING A SPATIAL INDEX

BACKGROUND

Data storage systems implement indexing structures to provide fast access operations. For example, in order to service a read request, an index structure that is maintained for data in a data store may be accessed in order to determine the location of requested data and service the read request. Index structures may be optimized for locating different types or combinations of data. Some index structures, for example, may be optimized for searching for unique or near-unique values (e.g., table primary keys). Some index structures may be optimized for storing a particular type of data. A spatial index, for instance, may be maintained to provide access to spatial data, data representing n-dimensional points, shapes, or objects. Different techniques may be implemented to further optimize specialized index structures, like a spatial data index, so that querying for certain spatial data may be quickly and efficiently performed.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION

Various embodiments of tracking granularity levels for accessing a spatial index are described herein. Data stores may utilize indexing structures to provide efficient access to data stored in the data store, in some embodiments. For spatial data, data representing points, locations, shapes, figures, lines or other geographic information, a spatial index may provide an efficient way to access spatial data stored in a data store, in one embodiment. For example, spatial queries may be submitted and evaluated with respect to the spatial data store to retrieve spatial objects (and any other data related to the spatial object, such as other column values in the same row of the identified spatial object), in one embodiment. In this way, the connection between other data maintained in the data store in addition to the spatial data (e.g., time, identity, what happened) may be evaluated with respect to spatial data, in one embodiment. For instance, a database that tracks music purchases, recording the time, date, identity, and location coordinates, could be queried to determine if the purchase request occurred during a concert at a concert venue for a band that produced the purchased music by submitting a spatial query for purchases that occurred within a location, the concert venue, time, and product purchase (e.g., songs or albums released by the band), in one embodiment.

Figure 1:
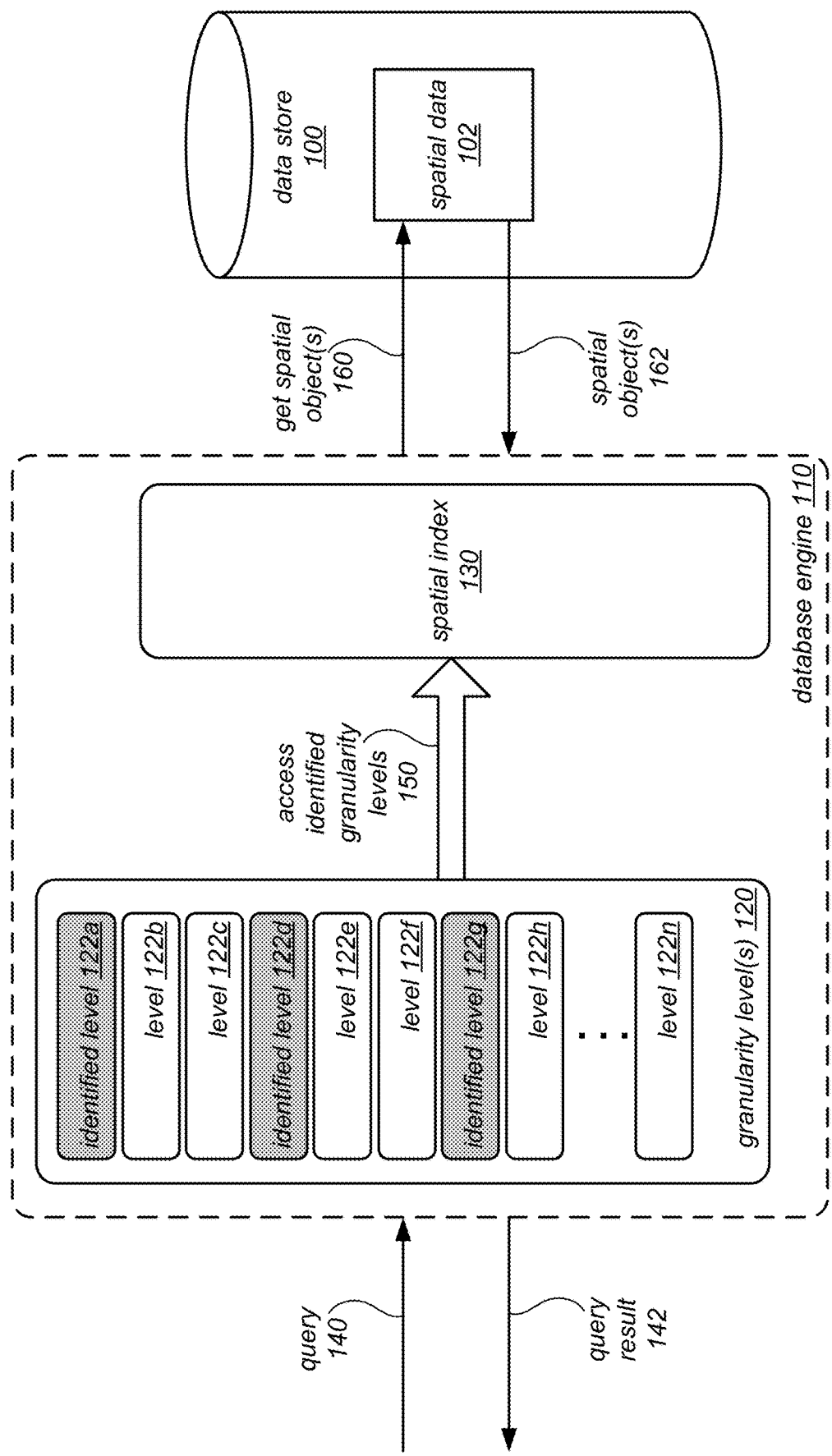
FIG. 1 is a logical diagram that illustrates tracking granularity levels for accessing a spatial index, according to some embodiments.

Spatial data can be represented over a wide range of possible sizes, in various embodiments. For example, using data formats such as Geographic Information Systems (GIS) integer or floating point values, objects the size of planets can be indexed and stored in the same data store as molecular sized objects, in one embodiment. Tracking granularity levels for accessing a spatial index may be implemented so that data sets with items with diverse object sizes can still be efficiently searched, without probing or evaluating every possible location in a spatial index maintained for the data set. FIG. 1 is a logical diagram that illustrates tracking granularity levels for accessing a spatial index, according to some embodiments. Database engine 110 may be any type of database (e.g., relational or non-relational) or other engine configured to process queries for data stored in a data store, such as data store 100, in one embodiment. Database engine 110 may be implemented together with data store 100 separately (e.g., via network connection from a computing device implementing storage engine 110 and a remote storage server implementing data store 100, or together (e.g., as part of the same computing device, where data store 100 is attached, local storage), in some embodiments. Spatial data 102 may be maintained in data store 100 and made available via database engine 110 to request spatial data object(s) (indicated at 160 and 162) for query access providing a query result 142 or to add, update, or remove some or all of spatial data 202, in some embodiments.

Database engine 110 may, in various embodiments, may use a spatial index 130 for accessing spatial data 202. For example, the indexing scheme for spatial index 130 may map n-dimensional spatial data into a single dimension, via a space filling curve, such as a Z-order curve or a Hilbert curve, in one embodiment. For example, a spatial area that includes all of the spatial data to be stored in spatial data 202 may be decomposed into different regions (e.g., 4 quadrants), in one embodiment. Each of these quadrants may be assigned a quadrant identifier. In order to map a spatial object, the smallest region that wholly includes the object may be identified. Thus, a recursive technique may be implemented where the original regions are subdivided into different granularity levels (e.g., each quadrant sub-divided into quadrants, and so on for each granularity level) until a region is reached where the object is not wholly included in the region. The prior region with coarser granularity that did wholly include the object is identified as the smallest region that wholly includes the object. Each time the regions are divided into a smaller granularity, a new granularity level may be maintained in the spatial index 130, in various embodiments. The number of granularity levels may depend on the range of objects sizes that may be stored in a database, in one embodiment. For example, spatial data representing floating point values in a spatial format (e.g., Geographic Information Systems (GIS)) may have thousands of levels. A different format or data type for spatial values may have a lesser number of levels (e.g., hundreds of levels).

An indexing schema may take the sequence of regions that contain a spatial object and generate a value that is used to locate a spatial object (or an identifier or representation of the spatial object) or retrieve a spatial object based a value generated for query predicates with respect to spatial index 130, in some embodiments. Selecting regions to include a data object (and thus determining the region number) may be done in different ways, in some embodiments. For example, XZ ordering, which may be implemented in some embodiments, defines overlapping regions, so that smaller objects that are located on or just over boundaries between less granular quadrants may be wholly included in an overlapping region that has higher granularity (and thus better selectivity when evaluating spatial queries). The identified regions that include an object may be used to determine the location of an object in spatial index 130, in one embodiment. For example, in various embodiments spatial index 130 may be implemented as a balanced tree or other order-preserving, one dimensional structure. Different leaf nodes of a b tree, for instance, may correspond to different regions (e.g., different region numbers).

If a large range of object sizes are possible, then a large number of granularity levels may be possible, in various embodiments. As illustrated in FIG. 1, many granularity level(s) 120 may exist for spatial index 130. As objects may be identified in different ones of the granularity levels, a query 140 that is received at database engine 110 for spatial data may have to evaluate each level 122 that identifies a data object in order to ensure that a data object satisfying query 140 is not missed. In various embodiments, the granularity levels of spatial index 130 may be evaluated, as discussed below with regard to FIGS. 7 and 9 in order to identify those levels which identify at least one data object in spatial data 102 (e.g., identified levels 122a, 122d, and 122g). In this way, spatial index 130 may be selectively accessed 150, so that an evaluation of index values at the different granularity levels is only performed for those granularity levels that identify data objects (saving time and execution resources from being wasted on evaluations of empty granularity levels 120 at spatial index 130), in various embodiments. For instance, ranges of index values may be determined that satisfy a predicate value for a spatial query and the index values at the spatial query at the identified levels (122a, 122d, and 122g) may evaluated to see if the index values are within the range of index values. As discussed below with regard to FIGS. 8 and 9, in some embodiments a scan operation for levels that are not identified, such as levels 122b-c, 122e-f, and 122h-n, may be performed to check whether additional data objects have been added since levels 122a, 122d, and 122g were identified. If an object has been added, then the object may be retrieved from spatial data 202 and evaluated for the query 140 in addition to the evaluations of the spatial index 130 at the identified levels. Alternatively, if many objects are found, an evaluation of the index values of the identified granularity level that includes the multiple objects may be performed.

Please note, FIG. 1 is provided as a logical illustration of tracking granularity levels for accessing a spatial index, and is not intended to be limiting as to the indexing schema, spatial index, database engine or data store.

The specification first describes an example of a database service that may implement tracking granularity levels for accessing a spatial index hosted by the database service, according to various embodiments. The example database service may host spatial data for many different types of clients, in various embodiments. Included in the description of the example network-based database service are various aspects of the example network-based database service along with the various interactions between the database service and a separate storage service which may store the spatial data. The specification then describes a flowchart of various embodiments of methods for tracking granularity levels for accessing a spatial index. Next, the specification describes an example system that may implement the disclosed techniques. Various examples are provided throughout the specification.

The systems described herein may, in some embodiments, implement a network-based service that enables clients (e.g., subscribers) to operate a data storage system in a cloud computing environment. In some embodiments, the data storage system may be an enterprise-class database system that is highly scalable and extensible. In some embodiments, queries may be directed to database storage that is distributed across multiple physical resources, and the database system may be scaled up or down on an as needed basis. The database system may work effectively with database schemas of various types and/or organizations, in different embodiments. In some embodiments, clients/subscribers may submit queries in a number of ways, e.g., interactively via an SQL interface to the database system. In other embodiments, external applications and programs may submit queries using Open Database Connectivity (ODBC) and/or Java Database Connectivity (JDBC) driver interfaces to the database system.

In various embodiments, the database systems described herein may support a standard or custom application programming interface (API) for a variety of database operations. For example, the API may support operations for creating a database, creating a table, altering a table, creating a user, dropping a user, inserting one or more rows in a table, copying values, selecting data from within a table (e.g., querying a table), canceling or aborting a query, creating a snapshot, and/or other operations.

In some embodiments, the database tier of a database instance may include a database engine head node server that receives read and/or write requests from various client programs (e.g., applications) and/or subscribers (users), then parses them and develops an execution plan to carry out the associated database operation(s). For example, the database engine head node may develop the series of steps necessary to obtain results for complex queries and joins. In some embodiments, the database engine head node may manage communications between the database tier of the database system and clients/subscribers, as well as communications between the database tier and a separate storage system.

In some embodiments, the database engine head node may be responsible for receiving SQL requests from end clients through a JDBC or ODBC interface and for performing SQL processing and transaction management (which may include locking) locally. However, rather than generating data pages locally, the database engine head node (or various components thereof) may generate redo log records and may ship them to the appropriate nodes of a separate storage system. In some embodiments, a client-side driver for the storage system may be hosted on the database engine head node and may be responsible for routing redo log records to the storage system node (or nodes) that store the segments (or data pages thereof) to which those redo log records are directed. For example, in some embodiments, each segment may be mirrored (or otherwise made durable) on multiple storage system nodes that form a protection group. In such embodiments, the client-side driver may keep track of the nodes on which each segment is stored and may route redo logs to all of the nodes on which a segment is stored (e.g., asynchronously and in parallel, at substantially the same time), when a client request is received. As soon as the client-side driver receives an acknowledgement back from a write quorum of the storage nodes in the protection group (which may indicate that the redo log record has been written to the storage node), it may send an acknowledgement of the requested change to the database tier (e.g., to the database engine head node). For example, in embodiments in which data is made durable through the use of protection groups, the database engine head node may not be able to commit a transaction until and unless the client-side driver receives a reply from enough storage node instances to constitute a write quorum, as may be defined in a protection group policy for the data.

In some embodiments, the database tier may support the use of synchronous or asynchronous read replicas in the system, e.g., read-only copies of data on different nodes of the database tier to which read requests can be routed. In such embodiments, if the database engine head node for a given database receives a read request directed to a particular data page, it may route the request to any one (or a particular one) of these read-only copies. In some embodiments, the client-side driver in the database engine head node may be configured to notify these other nodes about updates and/or invalidations to cached data pages (e.g., in order to prompt them to invalidate their caches, after which they may request updated copies of updated data pages from the storage layer).

In some embodiments, the client-side driver running on the database engine head node may expose a private interface to the storage tier. In some embodiments, it may also expose a traditional iSCSI interface to one or more other components (e.g., other database engines or virtual computing services components). In some embodiments, storage for a database instance in the storage tier may be modeled as a single volume that can grow in size without limits, and that can have an unlimited number of IOPS associated with it. When a volume is created, it may be created with a specific size, with a specific availability/durability characteristic (e.g., specifying how it is replicated), and/or with an IOPS rate associated with it (e.g., both peak and sustained). For example, in some embodiments, a variety of different durability models may be supported, and users/subscribers may be able to specify, for their database, a number of replication copies, zones, or regions and/or whether replication is synchronous or asynchronous based upon their durability, performance and cost objectives.

Figure 2:
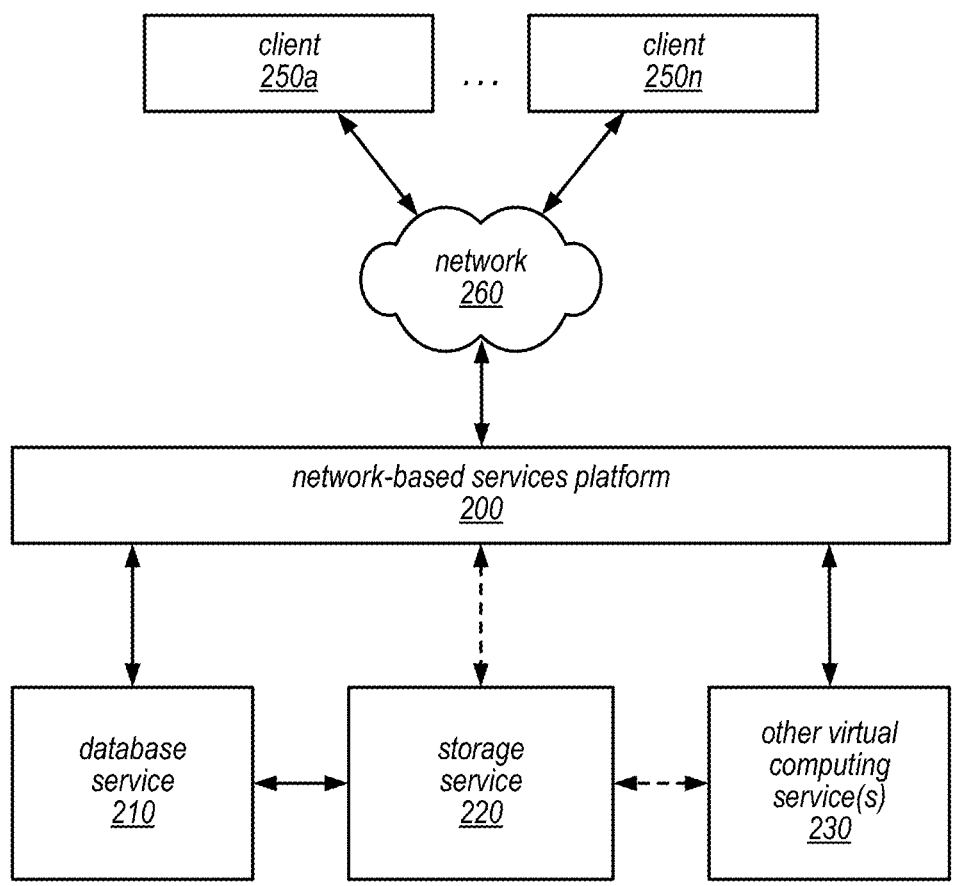
FIG. 2 is a block diagram illustrating a service system architecture that may be configured to implement a network-based database service and a network-based storage service that may provide access to spatial data, according to some embodiments.

FIG. 2 is a block diagram illustrating a service system architecture that may be configured to implement a network-based database service and a network-based storage service that may provide access to spatial data, according to some embodiments. In the illustrated embodiment, a number of clients (shown as clients 250a-250n) may be configured to interact with a network-based services platform 200 via a network 260. Network-based services platform 200 may be configured to interface with one or more instances of a database service 210, a storage service 220 and/or one or more other virtual computing services 230. Storage service may be implemented as log-structured storage using a single log sequence number space. It is noted that where one or more instances of a given component may exist, reference to that component herein may be made in either the singular or the plural. However, usage of either form is not intended to preclude the other.

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in 20 FIG. 11 and described below. In various embodiments, the functionality of a given service system component (e.g., a component of the database service or a component of the storage service) may be implemented by a particular node or may be distributed across several nodes. In some embodiments, a given node may implement the functionality of more than one service system component (e.g., more than one database service system component).

Generally speaking, clients 250 may encompass any type of client configurable to submit network-based services requests to network-based services platform 200 via network 260, including requests for database services (e.g., a request to generate a snapshot, etc.). For example, a given client 250 may include a suitable version of a web browser, or may include a plug-in module or other type of code module configured to execute as an extension to or within an execution environment provided by a web browser. Alternatively, a client 250 (e.g., a database service client) may encompass an application such as a database application (or user interface thereof), a media application, an office application or any other application that may make use of persistent storage resources to store and/or access one or more databases. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 250 may be an application configured to interact directly with network-based services platform 200. In some embodiments, client 250 may be configured to generate network-based services requests according to a Representational State Transfer (REST)-style network-based services architecture, a document-or message-based network-based services architecture, or another suitable network-based services architecture.

In some embodiments, a client 250 (e.g., a database service client) may be configured to provide access to network-based services-based storage of databases to other applications in a manner that is transparent to those applications. For example, client 250 may be configured to integrate with an operating system or file system to provide storage in accordance with a suitable variant of the storage models described herein. However, the operating system or file system may present a different storage interface to applications, such as a conventional file system hierarchy of files, directories and/or folders. In such an embodiment, applications may not need to be modified to make use of the storage system service model. Instead, the details of interfacing to network-based services platform 200 may be coordinated by client 250 and the operating system or file system on behalf of applications executing within the operating system environment.

Clients 250 may convey network-based services requests (e.g., a snapshot request, parameters of a snapshot request, read request, restore a snapshot, etc.) to and receive responses from network-based services platform 200 via network 260. In various embodiments, network 260 may encompass any suitable combination of networking hardware and protocols necessary to establish network-based-based communications between clients 250 and platform 200. For example, network 260 may generally encompass the various telecommunications networks and service providers that collectively implement the Internet. Network 260 may also include private networks such as local area networks (LANs) or wide area networks (WANs) as well as public or private wireless networks. For example, both a given client 250 and network-based services platform 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and network-based services platform 200. It is noted that in some embodiments, clients 250 may communicate with network-based services platform 200 using a private network rather than the public Internet. For example, clients 250 may be provisioned within the same enterprise as a database service system (e.g., a system that implements database service 210 and/or storage service 220). In such a case, clients 250 may communicate with platform 200 entirely through a private network 260 (e.g., a LAN or WAN that may use Internet-based communication protocols but which is not publicly accessible).

Generally speaking, network-based services platform 200 may be configured to implement one or more service endpoints configured to receive and process network-based services requests, such as requests to access data pages (or records thereof). For example, network-based services platform 200 may include hardware and/or software configured to implement a particular endpoint, such that an HTTP-based network-based services request directed to that endpoint is properly received and processed. In one embodiment, network-based services platform 200 may be implemented as a server system configured to receive network-based services requests from clients 250 and to forward them to components of a system that implements database service 210, storage service 220 and/or another virtual computing service 230 for processing. In other embodiments, network-based services platform 200 may be configured as a number of distinct systems (e.g., in a cluster topology) implementing load balancing and other request management features configured to dynamically manage large-scale network-based services request processing loads. In various embodiments, network-based services platform 200 may be configured to support REST-style or document-based (e.g., SOAP-based) types of network-based services requests.

In addition to functioning as an addressable endpoint for clients' network-based services requests, in some embodiments, network-based services platform 200 may implement various client management features. For example, platform 200 may coordinate the metering and accounting of client usage of network-based services, including storage resources, such as by tracking the identities of requesting clients 250, the number and/or frequency of client requests, the size of data tables (or records thereof) stored or retrieved on behalf of clients 250, overall storage bandwidth used by clients 250, class of storage requested by clients 250, or any other measurable client usage parameter. Platform 200 may also implement financial accounting and billing systems, or may maintain a database of usage data that may be queried and processed by external systems for reporting and billing of client usage activity. In certain embodiments, platform 200 may be configured to collect, monitor and/or aggregate a variety of storage service system operational metrics, such as metrics reflecting the rates and types of requests received from clients 250, bandwidth utilized by such requests, system processing latency for such requests, system component utilization (e.g., network bandwidth and/or storage utilization within the storage service system), rates and types of errors resulting from requests, characteristics of stored and requested data pages or records thereof (e.g., size, data type, etc.), or any other suitable metrics. In some embodiments such metrics may be used by system administrators to tune and maintain system components, while in other embodiments such metrics (or relevant portions of such metrics) may be exposed to clients 250 to enable such clients to monitor their usage of database service 210, storage service 220 and/or another virtual computing service 230 (or the underlying systems that implement those services).

In some embodiments, network-based services platform 200 may also implement user authentication and access control procedures. For example, for a given network-based services request to access a particular database, platform 200 may be configured to ascertain whether the client 250 associated with the request is authorized to access the particular database. Platform 200 may determine such authorization by, for example, evaluating an identity, password or other credential against credentials associated with the particular database, or evaluating the requested access to the particular database against an access control list for the particular database. For example, if a client 250 does not have sufficient credentials to access the particular database, platform 200 may reject the corresponding network-based services request, for example by returning a response to the requesting client 250 indicating an error condition. Various access control policies may be stored as records or lists of access control information by database service 210, storage service 220 and/or other virtual computing services 230.

It is noted that while network-based services platform 200 may represent the primary interface through which clients 250 may access the features of a database system that implements database service 210, it need not represent the sole interface to such features. For example, an alternate API that may be distinct from a network-based services interface may be used to allow clients internal to the enterprise providing the database system to bypass network-based services platform 200. Note that in many of the examples described herein, storage service 220 may be internal to a computing system or an enterprise system that provides database services to clients 250, and may not be exposed to external clients (e.g., users or client applications). In such embodiments, the internal "client" (e.g., database service 210) may access storage service 220 over a local or private network, shown as the solid line between storage service 220 and database service 210 (e.g., through an API directly between the systems that implement these services). In such embodiments, the use of storage service 220 in storing databases on behalf of clients 250 may be transparent to those clients. In other embodiments, storage service 220 may be exposed to clients 250 through network-based services platform 200 to provide storage of databases or other information for applications other than those that rely on database service 210 for database management. This is illustrated in FIG. 2 by the dashed line between network-based services platform 200 and storage service 220. In such embodiments, clients of the storage service 220 may access storage service 220 via network 260 (e.g., over the Internet). In some embodiments, a virtual computing service 230 may be configured to receive storage services from storage service 220 (e.g., through an API directly between the virtual computing service 230 and storage service 220) to store objects used in performing computing services 230 on behalf of a client 250. This is illustrated in FIG. 2 by the dashed line between virtual computing service 230 and storage service 220. In some cases, the accounting and/or credentialing services of platform 200 may be unnecessary for internal clients such as administrative clients or between service components within the same enterprise.

Although not illustrated, in various embodiments storage service 220 may be configured to interface with backup data store, system, service, or device. Various data, such as data pages, log records, and/or any other data maintained by storage service internal clients, such as database service 210 or other virtual computing services 230, and/or external clients such as clients 250a through 250n, may be sent to a backup data store.

Note that in various embodiments, different storage policies may be implemented by database service 210 and/or storage service 220. Examples of such storage policies may include a durability policy (e.g., a policy indicating the number of instances of a database (or data page thereof) that will be stored and the number of different nodes on which they will be stored) and/or a load balancing policy (which may distribute databases, or data pages thereof, across different nodes, volumes and/or disks in an attempt to equalize request traffic). In addition, different storage policies may be applied to different types of stored items by various one of the services. For example, in some embodiments, storage service 220 may implement a higher durability for redo log records than for data pages.

Figure 3:
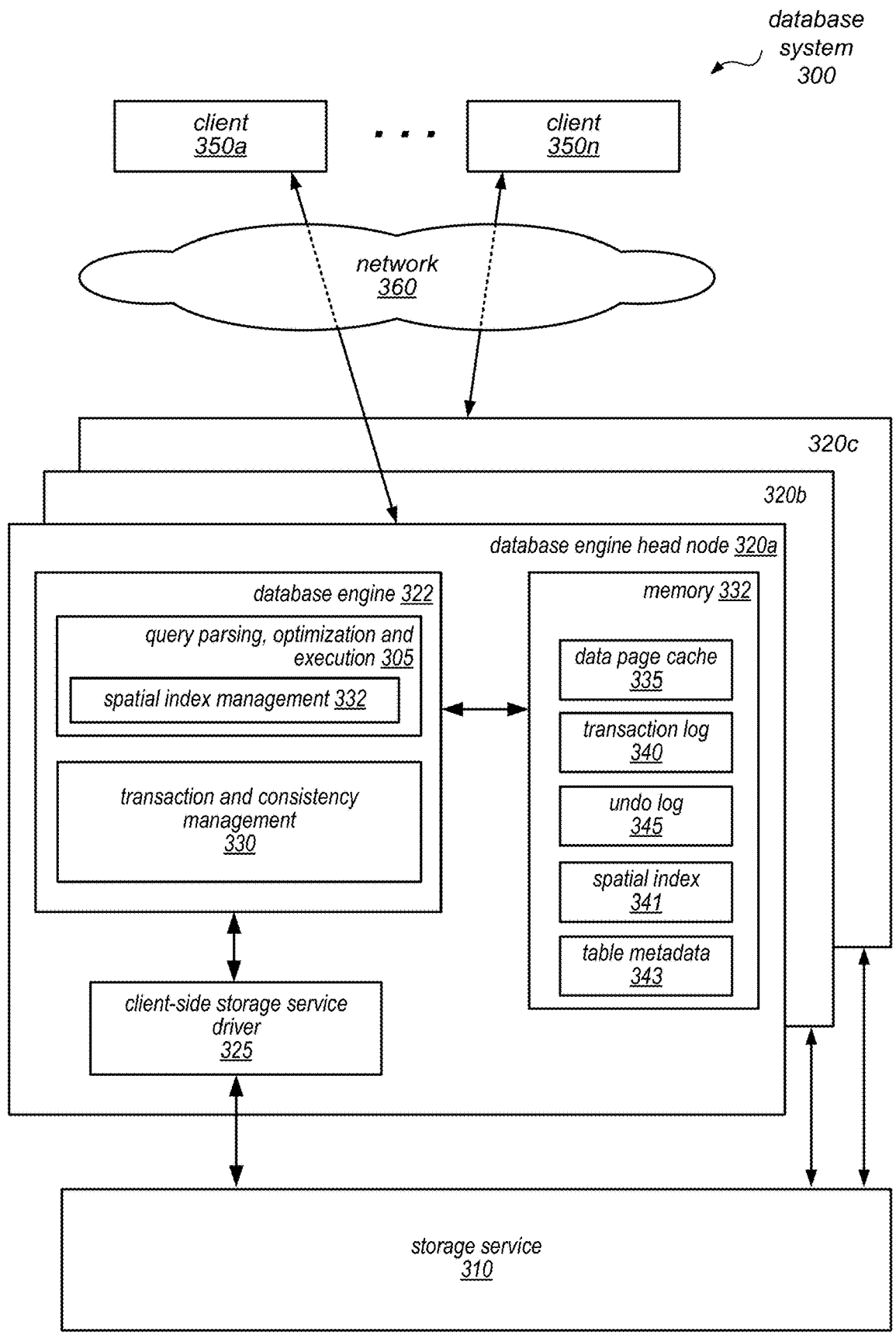
FIG. 3 is a block diagram illustrating various components of a database system that includes a database engine that implements tracking granularity levels for accessing a spatial index for spatial data maintained in a separate storage service, according to some embodiments.

FIG. 3 is a block diagram illustrating various components of a database system that includes a database engine that implements selective maintenance of a spatial index for spatial data maintained in a separate storage service, according to some embodiments. In this example, database system 300 includes a respective database engine head node 320 for each of several databases and a storage service 310 (which may or may not be visible to the clients of the database system, shown as database clients 350a-350n). As illustrated in this example, one or more of database clients 350a-350n may access a database head node 320 (e.g., head node 320a, head node 320b, or head node 320c, each of which is a component of a respective database instance) via network 360 (e.g., these components may be network-addressable and accessible to the database clients 350a-350n). However, storage service 310, which may be employed by the database system to store a database volume (such as data pages of one or more databases, as well as redo log records and/or other metadata associated therewith) on behalf of database clients 350a-350n, and to perform other functions of the database system as described herein, may or may not be network-addressable and accessible to the storage clients 350a-350n, in different embodiments. For example, in some embodiments, storage service 310 may perform various storage, access, change logging, recovery, log record manipulation, and/or space management operations in a manner that is invisible to storage clients 350a-350n.

As previously noted, each database instance may include a single database engine head node 320 that receives requests (e.g., a snapshot request, etc.) from various client programs (e.g., applications) and/or subscribers (users), then parses them, optimizes them, and develops an execution plan to carry out the associated database operation(s). In the example illustrated in FIG. 3, a query parsing, optimization, and execution component 305 of database engine head node 320a may perform these functions for queries that are received from database client 350a and that target the database instance of which database engine head node 320a is a component. In some embodiments, query parsing, optimization, and execution component 305 may return query responses to database client 350a, which may include write acknowledgements, requested data pages (or portions thereof), error messages, and or other responses, as appropriate.

Figure 4:
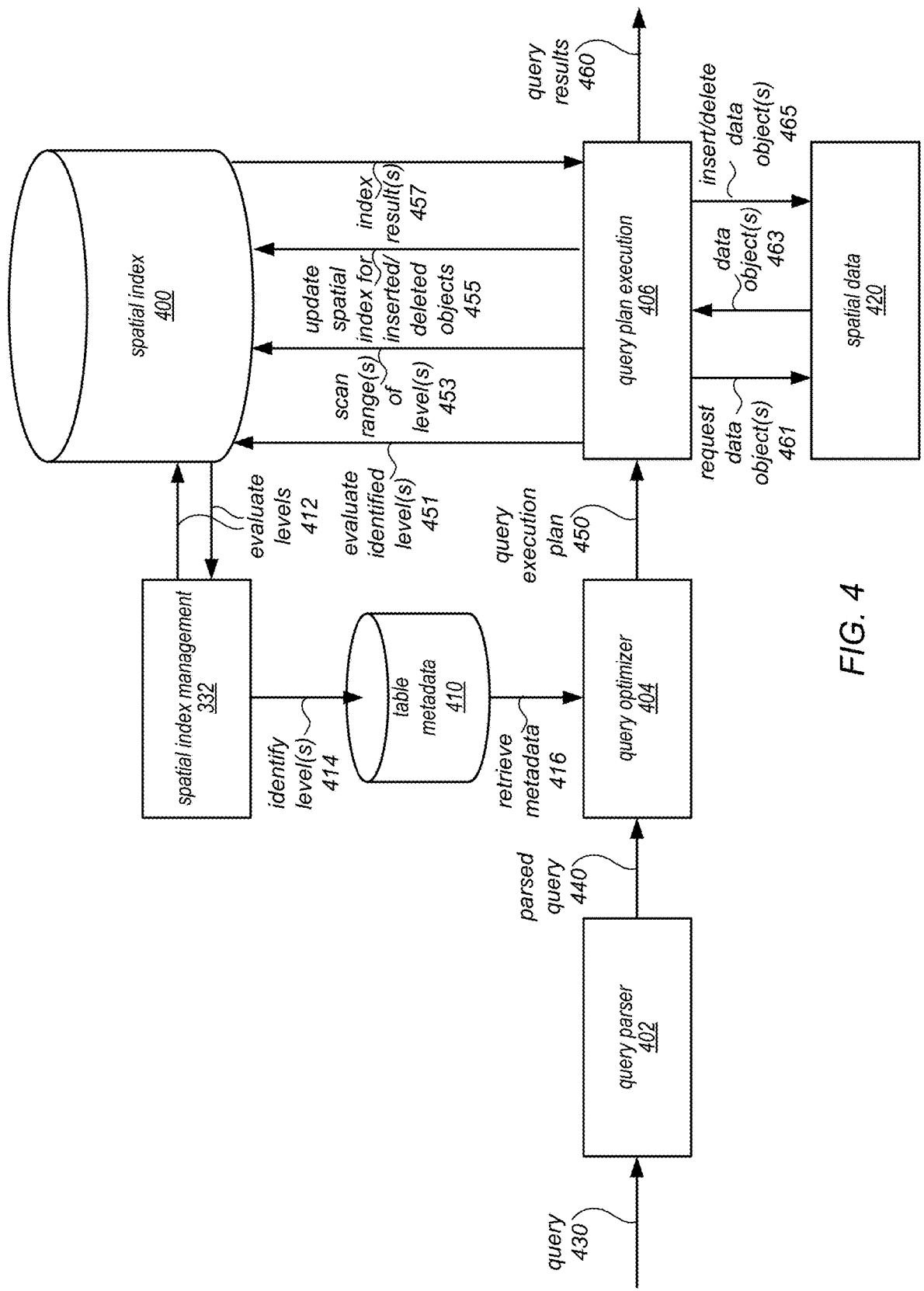
FIG. 4 is a block diagram illustrating an example spatial index manager that tracks granularity levels as part of generating a query execution plan, according to some embodiments.

In some embodiments, query parsing, optimization, and execution component 305 may implement spatial index management 332 to track granularity levels for accessing a spatial index 341 that describes spatial data stored as part of the database service in table metadata 343. FIG. 4 is a block diagram illustrating an example spatial index manager that tracks granularity levels as part of generating a query execution plan, according to some embodiments. Spatial index 400 may be maintained in a memory, as illustrated in FIG. 3 above, or in persistent storage to identify the location of data objects in a database according to an indexing scheme. As the contents of data objects in the data set may change, the content of objects identified in spatial index may change correspondingly, in various embodiments. For example, a query 430 that is parsed 440 by query parser 402, optimized according to a query execution plan 450 generated by query optimizer 404, and executed by query plan execution 406 may insert data objects or delete data objects 465 into spatial data 420. Corresponding updates for the insertion or deletion of data objects 457 may be performed with respect to spatial index 400.

Spatial index management 332 may access and evaluate granularity levels 412 of spatial index 400 (e.g., according to the techniques discussed below with regard to FIG. 10) in order to identify levels that identify at least one data object.

Spatial index management 332 may then store the identified levels 414 as part of table metadata 410 accessible to query optimizer 404. In this way, query optimizer 404 may only perform evaluation operations or probes of granularity levels of spatial index 400 known to include a data object. For example, query 430 may be received and parsed by query parser 402. The parsed query 440 may be provided to query optimizer 404 which may generate a query execution plan 450. As discussed below with regard to FIG. 8, the query execution plan may include operations 451 to evaluate identified granularity levels of spatial index 400, instead of all granularity levels of spatial index. Query optimizer 404 may also include operations to scan 453 remaining levels of spatial index for the existence of data objects. As discussed below with regard to FIG. 8, those objects discovered during such scans may be evaluated directly (e.g., by requesting 461 and receiving 463 the data objects from spatial data 420 for evaluation with respect to query 430). If a number of data objects are discovered above some threshold, then the query execution plan 450 may be modified to include an evaluation operation 451 that evaluates the level(s) that include the discovered objects.

Database engine head node 320a may also include a data page cache 335, in which data pages that were recently accessed may be temporarily held. As illustrated in FIG. 3, database engine head node 320a may also include a transaction and consistency management component 330, which may be responsible for providing transactionality and consistency in the database instance of which database engine head node 320a is a component. For example, this component may be responsible for ensuring the Atomicity, Consistency, and Isolation properties of the database instance and the transactions that are directed that the database instance. As illustrated in FIG. 3, database engine head node 320a may also include a transaction log 340 and an undo log 345, which may be employed by transaction and consistency management component 330 to track the status of various transactions and roll back any locally cached results of transactions that do not commit.

Database engine head node 320a may also include a client-side storage service driver 325, which may route read requests and/or redo log records to various storage nodes within storage service 310, receive write acknowledgements from storage service 310, receive requested data pages from storage service 310, and/or return data pages, error messages, or other responses to query parsing, optimization, and execution component 305 (which may, in turn, return them to database client 350a). Client-side storage device may maintain mapping information about the database volume stored in storage service 310, such that a particular protection group maintaining a partition of the database volume may be determined. Read requests and redo log records may then be routed to storage nodes that are members of the protection group according to the partition of user data to which the read request is directed or to which the redo log record pertains.

Note that each of the other database engine head nodes 320 illustrated in FIG. 3 (e.g., 320b and 320c) may include similar components and may perform similar functions for queries received by one or more of database clients 350a-350n and directed to the respective database instances of which it is a component.

Figure 5:
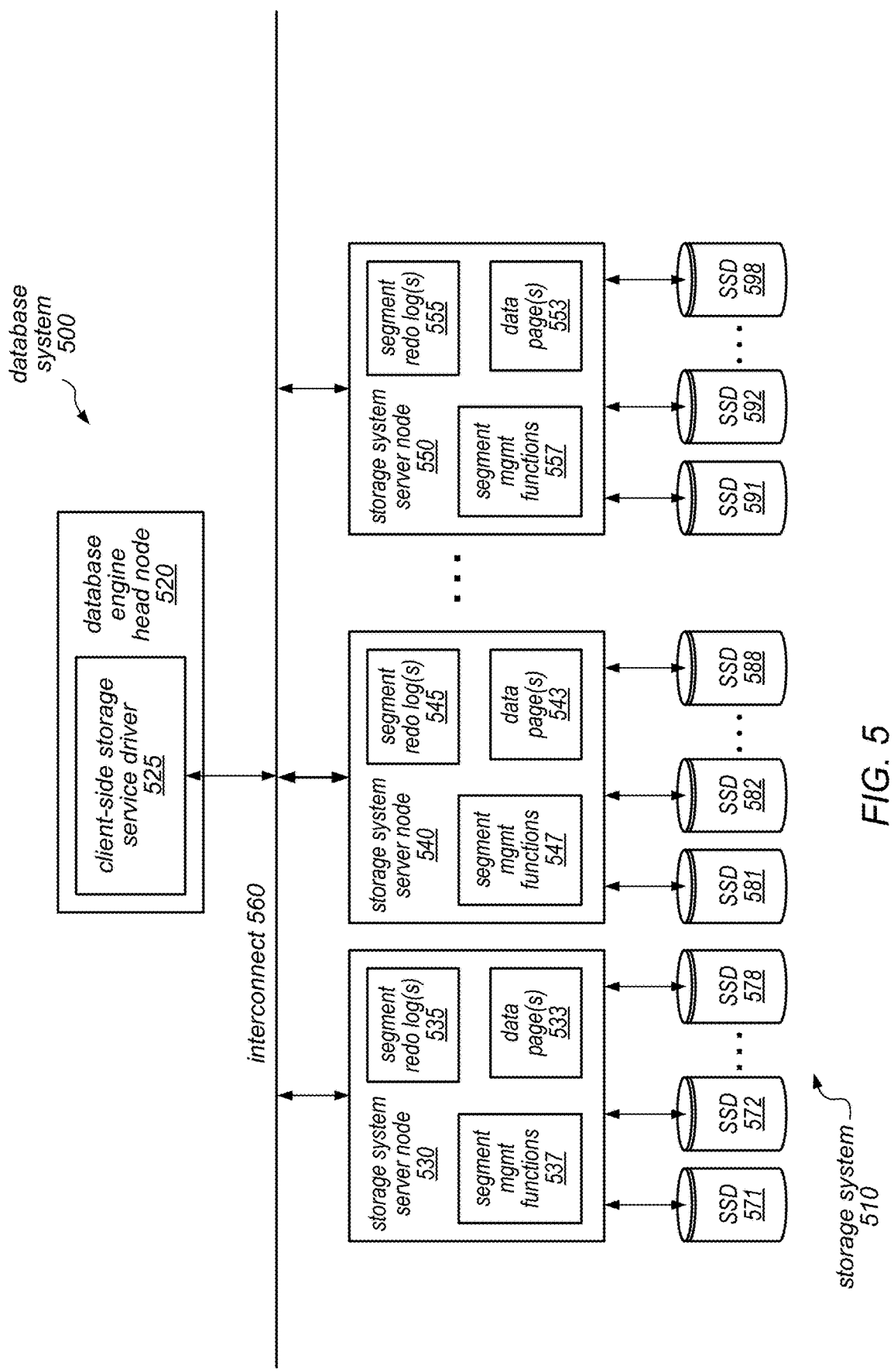
FIG. 5 is a block diagram illustrating a storage system that may store spatial data accessed by a database system, according to some embodiments.

One embodiment of a storage system is illustrated by the block diagram in FIG. 5. In at least some embodiments, storage nodes 530-550 may store data for different clients as part of a multi-tenant storage service. In some embodiments, a database system 500 may be a client of storage system 510, which communicates with a database engine head node 520 over interconnect 560. As in the example illustrated in FIG. 3, database engine head node 520 may include a client-side storage service driver 525. In this example, storage system 510 includes multiple storage system server nodes (including those shown as 530, 540, and 550), each of which includes storage for data pages and redo logs for the segment (s) it stores, and hardware and/or software configured to perform various segment management functions. For example, each storage system server node may include hardware and/or software configured to perform at least a portion of any or all of the following operations: replication (locally, e.g., within the storage node), coalescing of redo logs to generate data pages, snapshots (e.g., creating, restoration, deletion, etc.), log management (e.g., manipulating log records), crash recovery (e.g., determining candidate log records for volume recovery), and/or space management (e.g., for a segment). Each storage system server node may also have multiple attached storage devices (e.g., SSDs) on which data blocks may be stored on behalf of clients (e.g., users, client applications, and/or database service subscribers).

In the example illustrated in FIG. 5, storage system server node 530 includes data page(s) 533, segment redo log(s) 535, segment management functions 537, and attached SSDs 571-478. Again note that the label "SSD" may or may not refer to a solid-state drive, but may more generally refer to a local block storage volume, regardless of its underlying hardware. Similarly, storage system server node 540 includes data page(s) 543, segment redo log(s) 545, segment management functions 547, and attached SSDs 581-488; and storage system server node 550 includes data page(s) 553, segment redo log(s) 555, segment management functions 557, and attached SSDs 591-498.

In some embodiments, each of the storage system server nodes in the storage system may implement a set of processes running on the node server's operating system that manage communication with the database engine head node, e.g., to receive redo logs, send back data pages, etc. In some embodiments, all data blocks written to the storage system may be backed up to long-term and/or archival storage (e.g., in a remote key-value durable backup storage system).

Figure 6:
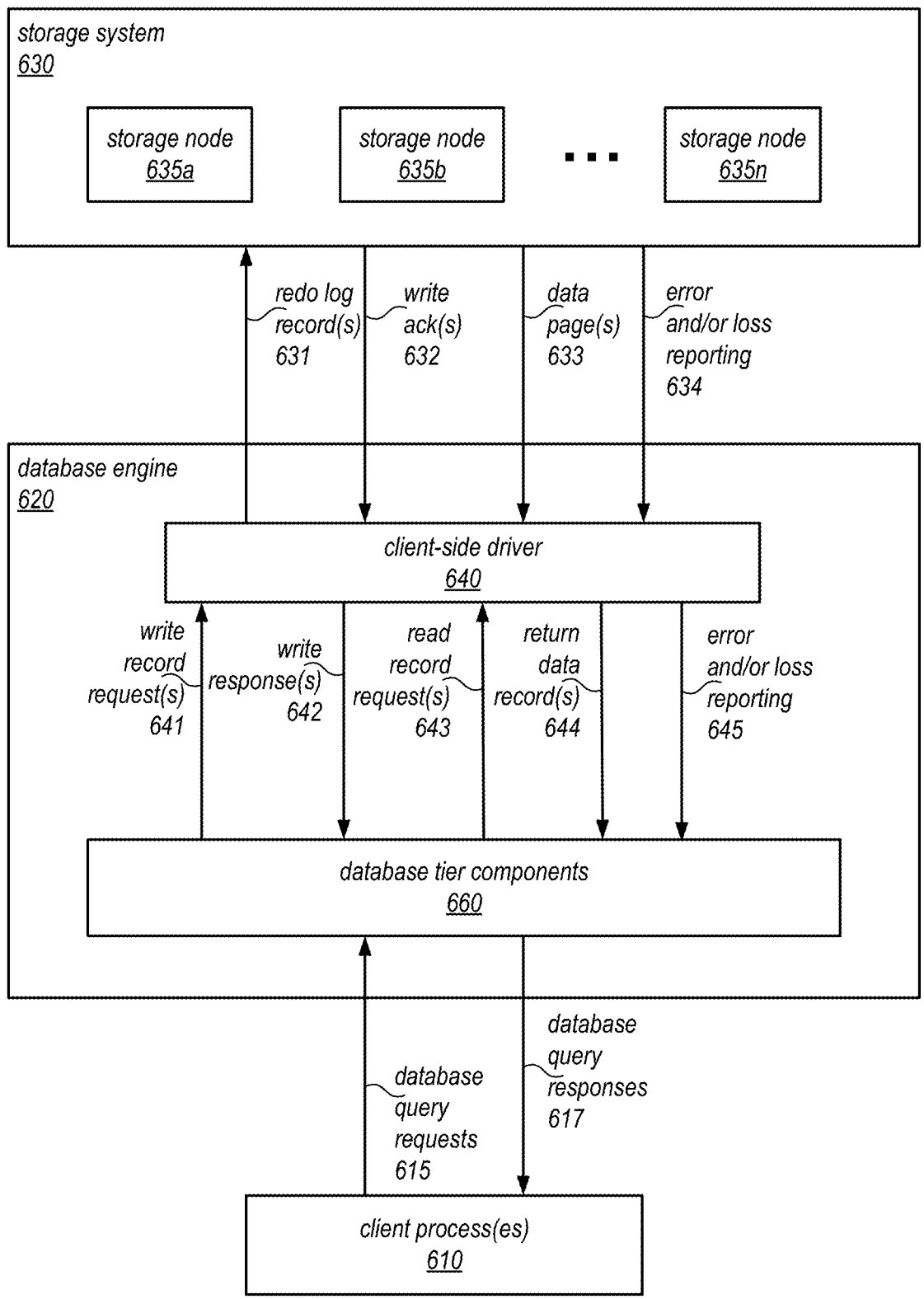
FIG. 6 is a block diagram illustrating the use of a separate storage system in a database system, according to some embodiments.

FIG. 6 is a block diagram illustrating the use of a separate storage system in a database system, according to one embodiment. In this example, one or more client processes 610 may store data to one or more databases maintained by a database system that includes a database engine 620 and a storage system 630. In the example illustrated in FIG. 6, database engine 620 includes database tier components 660 and client-side driver 640 (which serves as the interface between storage system 630 and database tier components 660). In some embodiments, database tier components 660 may perform functions such as those performed by query parsing, optimization and execution component 305 and transaction and consistency management component 330 of FIG. 3, and/or may store data pages, transaction logs and/or undo logs (such as those stored by data page cache 335, transaction log 340 and undo log 345 of FIG. 3). In various embodiments, database engine 620 may have obtained a volume epoch indicator or other identifier from storage system 630 granting access writes to a particular data volume, such as by sending a request to open the data volume to storage system 630.

In this example, one or more client processes 610 may send database query requests 615 (which may include read and/or write requests targeting data stored on one or more of the storage nodes 635a-635n) to database tier components 660, and may receive database query responses 617 from database tier components 660 (e.g., responses that include write acknowledgements and/or requested data). Each database query request 615 that includes a request to write to a data page may be parsed and optimized to generate one or more write record requests 641, which may be sent to client-side driver 640 for subsequent routing to storage system 630. In this example, client-side driver 640 may generate one or more redo log records 631 corresponding to each write record request 641, and may send them to specific ones of the storage nodes 635 of specific protection groups storing the partition user data of user data space to which the write record request pertains in storage system 630. Client-side driver 640 may generate metadata for each of the redo log records that includes an indication of a previous log sequence number of a log record maintained at the specific protection group. Storage system 630 may return a corresponding write acknowledgement(s) 623 for each redo log record 631 to database engine 620 (specifically to client-side driver 640). Client-side driver 640 may pass these write acknowledgements to database tier components 660 (as write responses 642), which may then send corresponding responses (e.g., write acknowledgements) to one or more client processes 610 as one of database query responses 617.

In this example, each database query request 615 that includes a request to read a data page may be parsed and optimized to generate one or more read record requests 643, which may be sent to client-side driver 640 for subsequent routing to storage system 630. In this example, client-side driver 640 may send these requests to specific ones of the storage nodes 635 of storage system 630, and storage system 630 may return the requested data pages 633 to database engine 620 (specifically to client-side driver 640). Client-side driver 640 may send the returned data pages to the database tier components 660 as return data records 644, and database tier components 660 may then send the data pages to one or more client processes 610 as database query responses 617.

In some embodiments, various error and/or data loss messages 634 may be sent from storage system 630 to database engine 620 (specifically to client-side driver 640). These messages may be passed from client-side driver 640 to database tier components 660 as error and/or loss reporting messages 645, and then to one or more client processes 610 along with (or instead of) a database query response 617.

In some embodiments, the APIs 631-534 of storage system 630 and the APIs 641-545 of client-side driver 640 may expose the functionality of the storage system 630 to database engine 620 as if database engine 620 were a client of storage system 630. For example, database engine 620 (through client-side driver 640) may write redo log records or request data pages through these APIs to perform (or facilitate the performance of) various operations of the database system implemented by the combination of database engine 620 and storage system 630 (e.g., storage, access, change logging, recovery, and/or space management operations). As illustrated in FIG. 6, storage system 630 may store data blocks on storage nodes 635a-635n, each of which may have multiple attached SSDs. In some embodiments, storage system 630 may provide high durability for stored data block through the application of various types of redundancy schemes.

Figure 7:
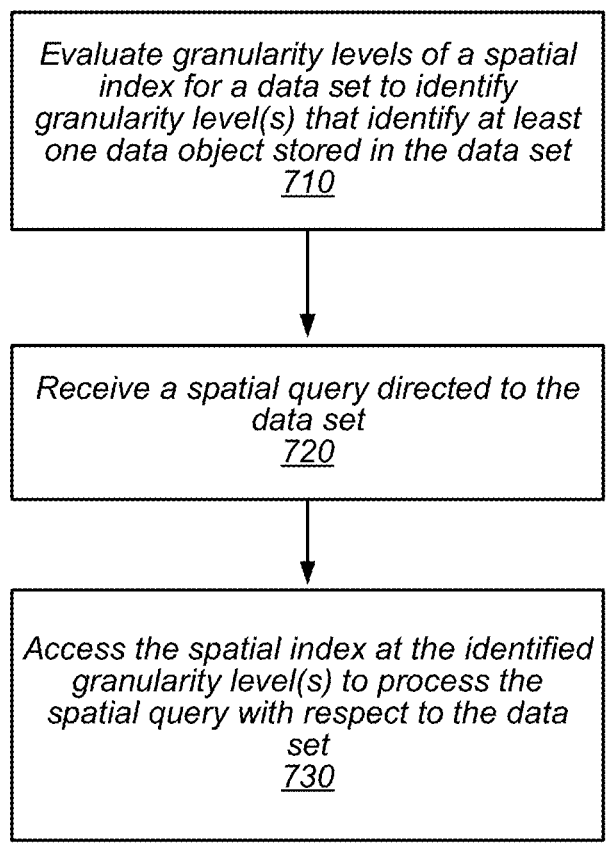
FIG. 7 is a high-level flowchart illustrating techniques to track granularity levels for accessing a spatial index, according to some embodiments.

The database service and storage service discussed in FIGS. 2 through 6 provide examples of a system that may track granularity levels for accessing a spatial index. However, various other types of data stores (e.g., database systems that do not utilize a separate storage system) or other storage engines may implement tracking granularity levels for accessing a spatial index. FIG. 7 is a high-level flowchart illustrating techniques to track granularity levels for accessing a spatial index, according to some embodiments.

As indicated at 710, granularity levels of a spatial index for a data set may be evaluated to identify granularity level(s) that identify at least one data object stored in the data set. A spatial index, as discussed above with regard to FIG. 1, may identify locations or regions that include spatial objects. Some spatial indexes may maintain multiple locations for a spatial object (e.g., when the spatial object cross multiple region boundaries, identifying each region that includes a portion of the spatial object), whereas other spatial indexes, such as those indexes implementing X-Z ordering as discussed above with regard to FIG. 1, may not duplicate objects in different spatial index locations. Granularity levels within a spatial index may indicate the granularity of regions within a portion of the index. For example, a first granularity level may subdivide the location of all possible spatial data into 4 regions or quadrants whereas as a $6^{th}$ level may subdivide the location of all possible spatial data into $4^6$ regions (e.g., 4096 regions). Various indexing schemes may be utilized to implement a spatial index. For example, in various embodiments, space filling curves, such as the Hilbert curve, Gray-Codes curve, U-Index curve, Peano curve, Z-mirror curves, or Morton-order (Z-order) curve, may be used to generate spatial index values for spatial objects so that the spatial objects may be ordered along the curve, and thus organized according to the spatial index values in the indexing structure implementing the spatial index. Different indexing structures may be utilized to implement the spatial index, including various forms of a balanced tree (e.g., B+tree), and may be an order-preserving, one-dimensional indexing structure.

The evaluation of a granularity level of a spatial index may be performed by scanning the portion of the spatial index associated with granularity level (e.g., according to the space filling curve). If an object is identified in the index (e.g., by a pointer to a storage location for the object in storage), then the granularity level of the spatial index may be identified as identifying at least one data object. As discussed below with regard to FIG. 10, the evaluation of the granularity levels of a spatial index may be performed periodically or in response to detected events in order to maintain the currency of the identified granularity levels.

As indicated at 720, a spatial query directed to the data set may be received. The spatial query may include a predicate that specifies an unbound and bound variable that are related by different operators. For example, an "overlaps" operator may be implemented to request data where the unbound variable (e.g., a geographic area) overlaps the bound variable (e.g., a figure). Other operators may include operations to determine whether the unbound variable "contains" the bound variable and operations to determine whether the unbound variable is "contained by" the bound variable.

As indicated at 730, the spatial index may be accessed at the identified granularity levels to process the spatial query with respect to the data set. For example, identified granularity levels may be obtained from metadata for the data set and used to generate a query execution plan that evaluates those identified granularity levels in the spatial index, as discussed below with regard to FIG. 8. Evaluating the spatial index at the identified granularity levels may include applying the spatial query to the index values (e.g., by determining a range of index values that satisfy a query predicate) in the spatial index to determine whether the data objects identified by the granularity level of the index satisfy the spatial query. For example, a determination may be made as to region(s) of the spatial data for servicing the query to be evaluated at the different granularity levels. For instance, the unbound variable may identify a geographic area (e.g., a query window) in which to determine whether the bound variable satisfies the operator (e.g., overlaps, contains, contained by). The regions of the spatial data may be determined according to the ways in which regions are represented by the spatial indexing schema. As regions may be different sizes at different granularity levels, the number of regions that are evaluated may change from one granularity level to another. Consider the quadrant scheme discussed above with regard to FIG. 1. If a quadrant is completely enclosed by the geographic area defined by the spatial query, then the quadrant is identified as a region for servicing the query at that granularity level. Such an analysis may be performed for each granularity level identified in the spatial index in order to service the query.

Figure 8:
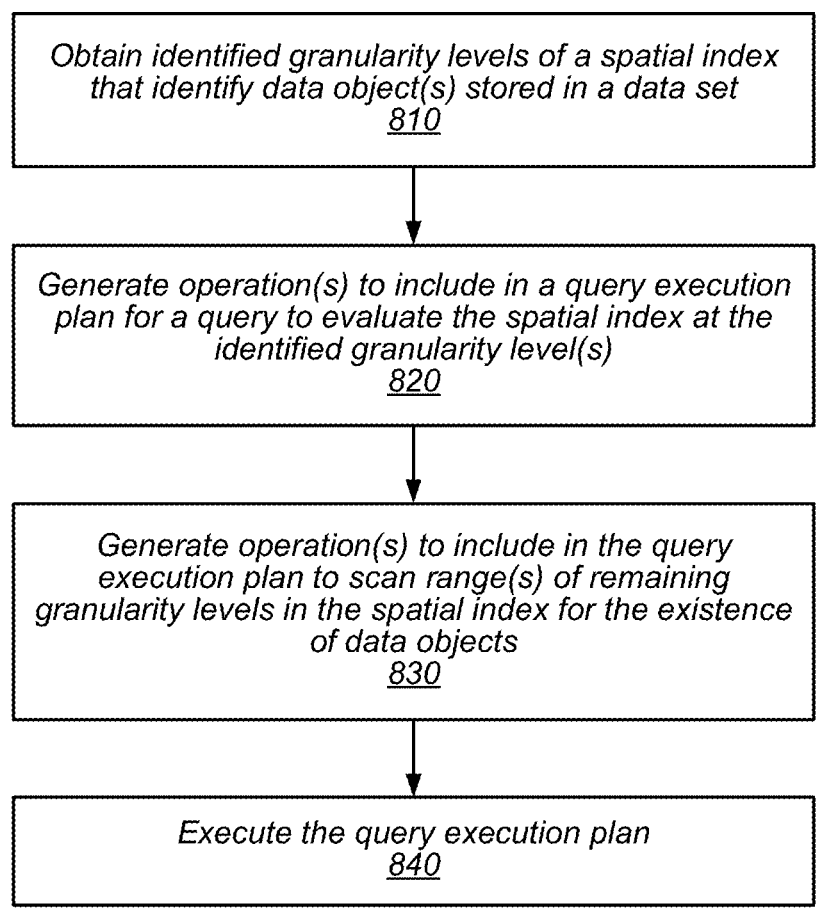
FIG. 8 is a high-level flowchart illustrating techniques for generating a query execution plan according to identified granularity levels, according to some embodiments.

FIG. 8 is a high-level flowchart illustrating techniques for generating a query execution plan according to identified granularity levels, according to some embodiments. As indicated at 810, identified granularity levels of a spatial index that identify data objects stored in a data set may be obtained, in some embodiments. For example, table or other data set metadata may be maintained for processing queries, including metadata, such as the number of rows in a column, the distribution of data values in a column, the number of distinct values in a column, along with the identified granularity levels.

As indicated at 820, operation(s) to include in query execution plan for the query to evaluate the spatial index at the identified granularity level(s) may be generated, in some embodiments. For example, if the spatial index is maintained in a b-tree data structure, operations to scan portions of the b-tree data structure that correspond to the different granularity levels (e.g. according to granularity level prefix or other indication determined as part of the indexing schema for the data set) and apply the spatial query using the index values in the spatial index (e.g., determining whether a data object satisfies the spatial query by determining ranges or sets of spatial index values that may, or do not, include data objects that satisfy the spatial query).

As indicated at 830, operations to include in the query execution plan to scan range(s) of remaining granularity levels for the existence of data objects may be generated, in some embodiments. For example, based on the identified granularity levels, the remaining levels out of the set of possible granularity levels may be determined (e.g., if identified levels are 5, 6, 7, 20, 11, and 12 out of 200 levels, then operations to scan levels 1-4, 8-9, and 12-100 may be generated). The operations may indicate that the operation is to check for the existence of data objects (as opposed to an evaluation as to whether the data objects satisfy the spatial query, in some embodiments. As indicated at 840, execution of the query execution plan may be initiated, in some embodiments.

Figure 9:
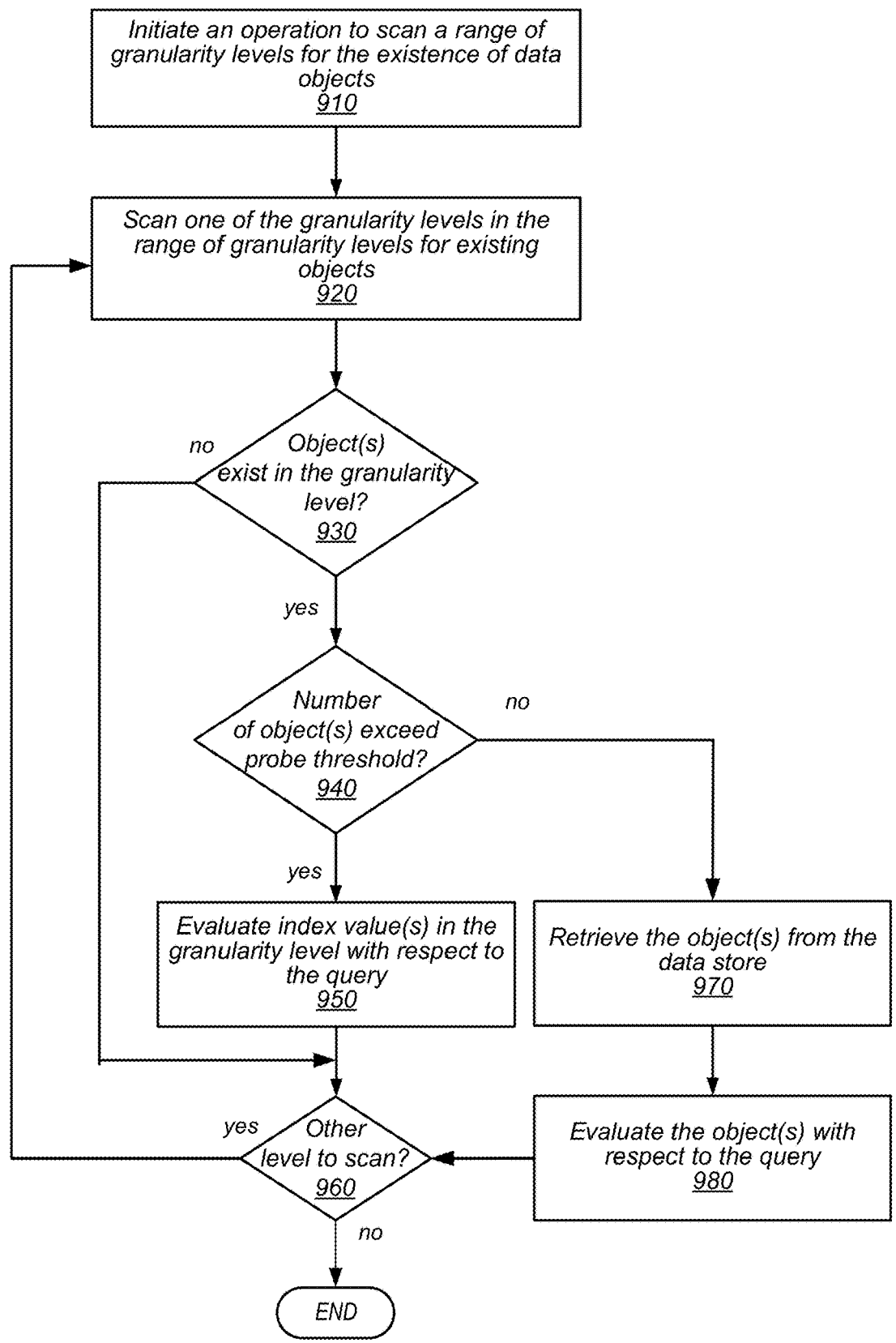
FIG. 9 is a high-level flowchart illustrating techniques for performing an operation to scan remaining granularity levels of a spatial index, according to some embodiments.

FIG. 9 is a high-level flowchart illustrating techniques for performing an operation to scan remaining granularity levels of a spatial index, according to some embodiments. As indicated at 910, an operation to scan 920 a range of granularity levels for the existence of data objects, in some embodiments. For example, the scan operation may scan a range of granularity levels not identified as storing data objects (e.g., by determining level ranges based on the identified granularity levels). A scan operation may scan through the corresponding portion of the spatial index for the level to see if any leaf nodes or other objects, structures, pointers, or other data objects for data may exist.

Depending on the number of existing objects found during the scan different responsive actions may be performed. For example, a threshold may be applied if objects are found (as indicated by the positive exit from 930). If the found object(s) do not exceed a probe threshold, then the object(s) may be retrieved from storage, as indicated at 970, and evaluated with respect to the query, as indicated at 980. For example, if the query predicate defines an area within which spatial objects of certain type are to be returned, then each of the retrieved objects may be compared with the defined area in order to determine whether the retrieved objects are within the area, in one embodiment.

While retrieving and applying the query predicates to some objects directly may not overburden the processing of the spatial query, as the number of data objects in a granularity increases the greater efficiency utilizing the spatial index provides. Thus, as indicated by the positive exit from 940, if the number of object(s) exceeds the probe threshold, then the index values in the granularity level may be evaluated with respect to the query (e.g., using index values to identify which spatial objects may satisfy the query predicate. The scan operation may continue as indicated at 960, until no more levels remain to be scanned. In this way, the scan operation may dynamically respond to unexpected numbers of data objects (e.g., as a result of a large number of inserts or updates to the database since the last time the granularity levels were identified and updated in metadata for the data set.

Figure 10:
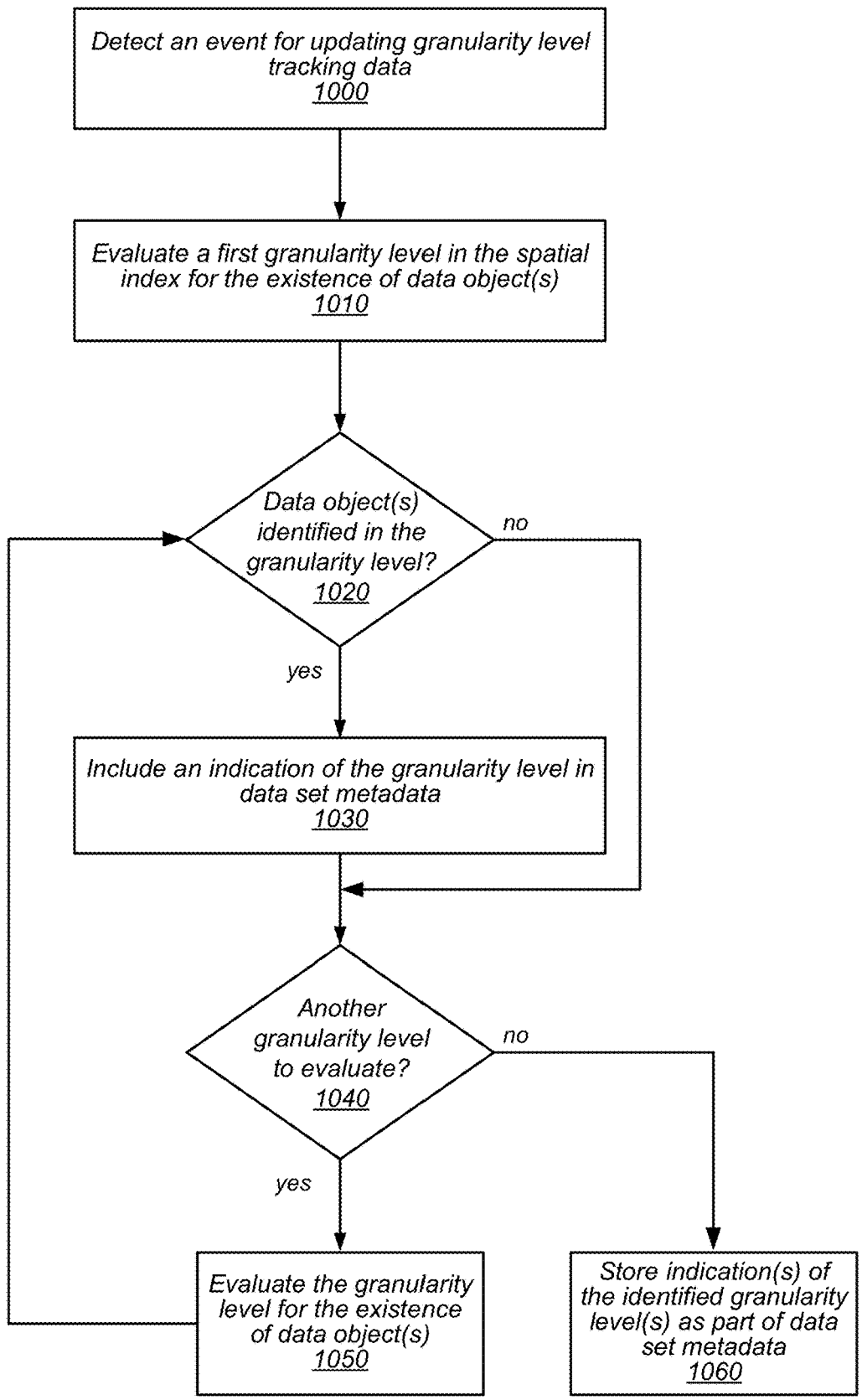
FIG. 10 is a high-level flowchart illustrating techniques for evaluating a spatial index to identify granularity levels that include data objects, according to some embodiments.

FIG. 10 is a high-level flowchart illustrating techniques for evaluating a spatial index to identify granularity levels that include data objects, according to some embodiments. Updating the granularity level tracking information may ensure that spatial queries do not have to spend time evaluating individual data objects retrieved as a results of a scan operation (e.g., element 830) instead of evaluating the index data values (e.g., element 820). As indicated at 1000, an event may be detected for updating the granularity level tracking data for a spatial index, in various embodiments. For example, in one embodiment, an update threshold corresponding to an amount of data that is updated since a last update to the granularity level tracking data may be monitored. If the amount of updates to the data set (e.g., measured by the number of insert requests or measured by the size of data stored) exceeds the update threshold, then an event for the evaluation of the spatial index may triggered with respect to elements 1010 through 1060 below. In another example embodiment, a time threshold may be implemented that measures an amount of time since the last update to the granularity level tracking data. If the time since the last update to the granularity level tracking data exceeds the time threshold, then an event for the evaluation of the spatial index may be triggered.

As indicated at 1010, a first granularity level may be identified and evaluated for the existence of data objects, in some embodiments. For example, a scan of the indexing structure (e.g., b-tree) may be performed to see if any objects are identified in the portion of the indexing structure. If not, as indicated by a negative exit from 1020, then another granularity level may be evaluated, as indicated at 1040. If a data object is identified in the granularity level, as indicated by a positive exit from 1020, then the granularity level may be included in data set metadata, as indicated at 1030. For example, an array, list, or other data structure that identifies granularity levels may be created and an identifier for the level (e.g., an indexing schema pre-fix value or level number) may be included in the data structure. As indicated at elements 1040 and 1050, the evaluation of granularity levels may proceed through all granularity levels, including those granularity levels in the data set metadata. Once the evaluation of the spatial index completes, as indicated at 1060, the identified granularity level(s) may be stored as part of data set metadata for the data set, in various embodiments. For example, statistics block or other portion of memory allocated to the spatial index and metadata associated with a data set may be written to include the identified granularity levels, in one embodiment.

The methods described herein may in various embodiments be implemented by any combination of hardware and software. For example, in one embodiment, the methods may be implemented by a computer system (e.g., a computer system as in 20 FIG. 11) that includes one or more processors executing program instructions stored on a computer-readable storage medium coupled to the processors. The program instructions may be configured to implement the functionality described herein (e.g., the functionality of various servers and other components that implement the database services/systems and/or storage services/systems described herein). The various methods as illustrated in the figures and described herein represent example embodiments of methods. The order of any method may be changed, and various elements may be added, reordered, combined, omitted, modified, etc.

Figure 11:
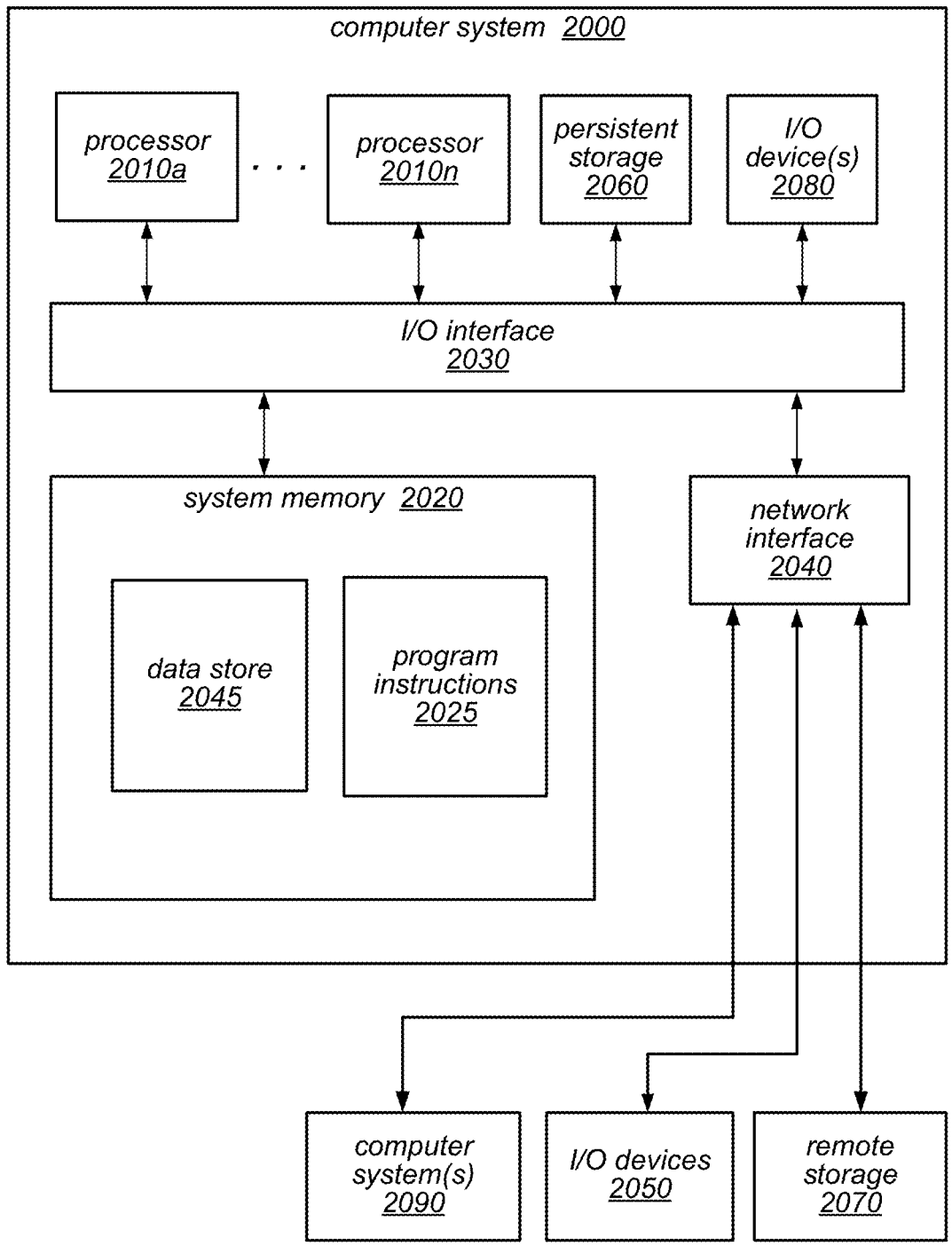
FIG. 11 is an example computer system, according to various embodiments.

20 FIG. 11 is a block diagram illustrating a computer system configured to implement tracking granularity levels for accessing a spatial index, as well as various other systems, components, services or devices described above. For example, computer system 20 2000 may be configured to implement a database engine head node of a database tier, or one of a plurality of storage nodes of a separate storage system that stores databases and associated metadata on behalf of clients of the database tier, in different embodiments. Computer system 20 2000 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing node, compute node, computing device, or electronic device.

Computer system 20 2000 includes one or more processors 20 2010 (any of which may include multiple cores, which may be single or multi-threaded) coupled to a system memory 20 2020 via an input/output (I/O) interface 20 2030. Computer system 20 2000 further includes a network interface 20 2040 coupled to I/O interface 20 2030. In various embodiments, computer system 202000 may be a uniprocessor system including one processor 202010, or a multiprocessor system including several processors 20 2010 (e.g., two, four, eight, or another suitable number). Processors 20 2010 may be any suitable processors capable of executing instructions. For example, in various embodiments, processors 20 2010 may be general-purpose or embedded processors implementing any of a variety of instruction set architectures (ISAs), such as the ×86, PowerPC, SPARC, or MIPS ISAs, or any other suitable ISA. In multiprocessor systems, each of processors 20 2010 may commonly, but not necessarily, implement the same ISA. The computer system 202000 also includes one or more network communication devices (e.g., network interface 20 2040) for communicating with other systems and/or components over a communications network (e.g. Internet, LAN, etc.). For example, a client application executing on system 202000 may use network interface 20 2040 to communicate with a server application executing on a single server or on a cluster of servers that implement one or more of the components of the database systems described herein. In another example, an instance of a server application executing on computer system 202000 may use network interface 20 2040 to communicate with other instances of the server application (or another server application) that may be implemented on other computer systems (e.g., computer systems 20 2090).

In the illustrated embodiment, computer system 202000 also includes one or more persistent storage devices 20 2060 and/or one or more I/O devices 20 2080. In various embodiments, persistent storage devices 20 2060 may correspond to disk drives, tape drives, solid state memory, other mass storage devices, or any other persistent storage device. Computer system 202000 (or a distributed application or operating system operating thereon) may store instructions and/or data in persistent storage devices 20 2060, as desired, and may retrieve the stored instruction and/or data as needed. For example, in some embodiments, computer system 202000 may host a storage system server node, and persistent storage 20 2060 may include the SSDs attached to that server node.

Computer system 202000 includes one or more system memories 20 2020 that are configured to store instructions and data accessible by processor(s) 20 2010. In various embodiments, system memories 20 2020 may be implemented using any suitable memory technology, (e.g., one or more of cache, static random access memory (SRAM), DRAM, RDRAM, EDO RAM, DDR 20 RAM, synchronous dynamic RAM (SDRAM), Rambus RAM, EEPROM, non-volatile/Flash-type memory, or any other type of memory). System memory 20 2020 may contain program instructions 20 2025 that are executable by processor(s) 20 2010 to implement the methods and techniques described herein. In various embodiments, program instructions 20 2025 may be encoded in platform native binary, any interpreted language such as Java™ byte-code, or in any other language such as C/C++, Java™, etc., or in any combination thereof. For example, in the illustrated embodiment, program instructions 20 2025 include program instructions executable to implement the functionality of a database engine head node of a database tier, or one of a plurality of storage nodes of a separate storage system that stores databases and associated metadata on behalf of clients of the database tier, in different embodiments. In some embodiments, program instructions 20 2025 may implement multiple separate clients, server nodes, and/or other components.

In some embodiments, program instructions 20 2025 may include instructions executable to implement an operating system (not shown), which may be any of various operating systems, such as UNIX, LINUX, Solaris™, MacOS™, Windows™, etc. Any or all of program instructions 20 2025 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 202000 via I/O interface 20

2030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 2000 as system memory 2020 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 2040.

In some embodiments, system memory 2020 may include data store 2045, which may be configured as described herein. For example, the information described herein as being stored by the database tier (e.g., on a database engine head node), such as a transaction log, an undo log, cached page data, or other information used in performing the functions of the database tiers described herein may be stored in data store 2045 or in another portion of system memory 2020 on one or more nodes, in persistent storage 2060, and/or on one or more remote storage devices 2070, at different times and in various embodiments. Similarly, the information described herein as being stored by the storage tier (e.g., redo log records, coalesced data pages, and/or other information used in performing the functions of the storage systems described herein) may be stored in data store 2045 or in another portion of system memory 2020 on one or more nodes, in persistent storage 2060, and/or on one or more remote storage devices 2070, at different times and in various embodiments. In general, system memory 2020 (e.g., data store 2045 within system memory 2020), persistent storage 2060, and/or remote storage 2070 may store data blocks, replicas of data blocks, metadata associated with data blocks and/or their state, database configuration information, and/or any other information usable in implementing the methods and techniques described herein.

In one embodiment, I/O interface 2030 may be configured to coordinate I/O traffic between processor 2010, system memory 2020 and any peripheral devices in the system, including through network interface 2040 or other peripheral interfaces. In some embodiments, I/O interface 2030 may perform any necessary protocol, timing or other data transformations to convert data signals from one component (e.g., system memory 2020) into a format suitable for use by another component (e.g., processor 2010). In some embodiments, I/O interface 2030 may include support for devices attached through various types of peripheral buses, such as a variant of the Peripheral Component Interconnect (PCI) bus standard or the Universal Serial Bus (USB) standard, for example. In some embodiments, the function of I/O interface 2030 may be split into two or more separate components, such as a north bridge and a south bridge, for example. Also, in some embodiments, some or all of the functionality of I/O interface 2030, such as an interface to system memory 2020, may be incorporated directly into processor 2010.

Network interface 2040 may be configured to allow data to be exchanged between computer system 202000 and other devices attached to a network, such as other computer systems 2090 (which may implement one or more storage system server nodes, database engine head nodes, and/or clients of the database systems described herein), for example. In addition, network interface 2040 may be configured to allow communication between computer system 202000 and various I/O devices 2050 and/or remote storage 2070. Input/output devices 2050 may, in some embodiments, include one or more display terminals, keyboards, keypads, touchpads, scanning devices, voice or optical recognition devices, or any other devices suitable for entering or retrieving data by one or more computer systems 202000. Multiple input/output devices 2050 may be present in computer system 202000 or may be distributed on various nodes of a distributed system that includes computer system 202000. In some embodiments, similar input/output devices may be separate from computer system 202000 and may interact with one or more nodes of a distributed system that includes computer system 202000 through a wired or wireless connection, such as over network interface 2040. Network interface 2040 may commonly support one or more wireless networking protocols (e.g., Wi-Fi/IEEE 802.11, or another wireless networking standard). However, in various embodiments, network interface 2040 may support communication via any suitable wired or wireless general data networks, such as other types of Ethernet networks, for example. Additionally, network interface 2040 may support communication via telecommunications/telephony networks such as analog voice networks or digital fiber communications networks, via storage area networks such as Fibre Channel SANs, or via any other suitable type of network and/or protocol. In various embodiments, computer system 202000 may include more, fewer, or different components than those illustrated in 20 FIG. 11 (e.g., displays, video cards, audio cards, peripheral devices, other network interfaces such as an ATM interface, an Ethernet interface, a Frame Relay interface, etc.)

It is noted that any of the distributed system embodiments described herein, or any of their components, may be implemented as one or more network-based services. For example, a database engine head node within the database tier of a database system may present database services and/or other types of data storage services that employ the storage systems described herein to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the network-based service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

The various methods as illustrated in the figures and described herein represent example embodiments of methods. The methods may be implemented manually, in software, in hardware, or in a combination thereof. The order of any method may be changed, and various elements may be added, reordered, combined, omitted, modified, etc.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A system, comprising:
    a memory to store program instructions which, when performed by at least one processor, cause the at least one processor to perform a method to at least:
        evaluate a plurality of granularity levels of a spatial index for a data set to identify one or more of the granularity levels that identify at least one data object stored in the data set, wherein the plurality of granularity levels of the spatial index comprises the one or more of the granularity levels that identify at least one data object stored in the data set and at least one remaining granularity level;
        store an indication of the identified one or more of the granularity levels of the spatial index, identified in the evaluating, as part of metadata for the data set;
        receive a spatial query directed to the data set; and
        in response to receiving the spatial query:
            obtain the indication of the identified one or more of the granularity levels of the spatial index from the metadata for the data set; and
            evaluate the spatial index at individual ones of the identified one or more of the granularity levels of the obtained indication to process the spatial query with respect to the data set, wherein the evaluating of the spatial index is not performed at the at least one remaining granularity level of the spatial index;
            scan the at least one remaining granularity level to determine the existence of data objects in the data set; and
            responsive to determining that at least one data object exists in the at least one remaining granularity level:
                retrieve the at least one data object from the data set; and
                evaluate the at least one data object to process the spatial query with respect to the data set.

2. The system of claim 1, wherein the method further comprises detect an event for updating granularity level tracking data, wherein the evaluation of the granularity levels and the storage of the indication of the identified granularity levels is performed in response to the detection of the event for updating the granularity level tracking data.

3. The system of claim 1, wherein the method further comprises:
    further in response to receiving the spatial query, generate a query execution plan that includes operations to evaluate the spatial index at the identified granularity levels, wherein the evaluation of the spatial index at the identified granularity levels to process the query is performed according to the query execution plan.

4. The system of claim 1, wherein the evaluation of the granularity levels, the storage of the indication of the granularity levels, the receipt of the spatial query, the obtain of the identified granularity levels and the evaluation of the spatial index are performed by a database engine implemented as part of a network-based database service, wherein the spatial query is received via a network interface for the database service, wherein the data set is stored in a network-based data storage service, wherein the database service and the data storage service are implemented as part of the same network-based services platform, and wherein the spatial query is received via a network interface for the database service.

5. A method, comprising:
    evaluating a plurality of granularity levels of a spatial index for a data set to identify one or more of the granularity levels that identify at least one data object stored in the data set, wherein the plurality of granularity levels of the spatial index comprises the one or more of the granularity levels that identify at least one data object stored in the data set and at least one remaining granularity level;
    receiving a spatial query directed to the data set; and
    in response to receiving the spatial query;
        accessing the spatial index at individual ones of the identified one or more of the granularity levels to process the spatial query with respect to the data set, wherein the accessing of the spatial index is not performed at the at least one remaining granularity level of the spatial index;
        scanning the at least one remaining granularity level to determine the existence of data objects in the data set; and
        responsive to determining that at least one data object exists in the at least one remaining granularity level, accessing the at least one data object to process the spatial query with respect to the data set.

6. The method of claim 5, further comprising detecting an event for updating granularity level tracking data, and wherein the evaluating the granularity levels of the spatial index is performed in response to the detection of the event for updating the granularity level tracking data.

7. The method of claim 6, wherein detecting the event for updating the granularity level tracking data comprises determining that an amount of updates to the data set exceeds an update threshold for the granularity level tracking data.

8. The method of claim 6,
    wherein the method further comprises storing respective indications for the identified granularity levels in metadata for the data in response to detecting the event; and
    wherein accessing the spatial index at the identified granularity levels comprises obtaining the identified granularity levels from metadata for the data set.

9. The method of claim 5, further comprising:
    further in response to receiving the spatial query, generating a query execution plan that includes operations to evaluate the spatial index at the identified granularity levels, wherein the accessing of the spatial index at the identified granularity levels to process the query is performed according to the query execution plan.

10. The method of claim 9, wherein generating the query execution plan comprises generating one or more operations to scan remaining ranges of granularity levels in the spatial index not identified in the evaluating of the plurality of granularity levels for the existence of data objects.

11. The method of claim 9, further comprising:
- determining, as part of performing the operations to scan remaining ranges of granularity levels, that a number of data objects identified by a scanned level exceeds a probe threshold; and
- modifying the query execution plan to include an operation that evaluates the scanned level of the spatial index as part of processing the spatial query.

12. The method of claim 5, wherein data objects stored in the data set are represented as floating point values in a Geographic Information Systems (GIS) data format.

13. The method of claim 5, wherein the evaluating, the receiving,
- and the accessing are performed by a database engine implemented as part of a network-based database service and wherein the spatial query is received via a network interface for the database service.

14. A non-transitory, computer-readable storage medium, storing program instructions that when executed by one or more computing devices cause the one or more computing devices to implement:
- evaluating a plurality of granularity levels of a spatial index for a data set to identify one or more of the granularity levels that identify at least one data object stored in the data set, wherein the plurality of granularity levels of the spatial index comprises the one or more of the granularity levels that identify at least one data object stored in the data set and at least one remaining granularity level;
- receiving a spatial query directed to the data set; and
- in response to receiving the spatial query;
  - evaluating the spatial index at individual ones of the identified one or more of the granularity levels to process the spatial query with respect to the data set, wherein the evaluating of the spatial index is not performed at the at least one remaining granularity level of the spatial index;
  - scanning the at least one remaining granularity level to determine the existence of data objects in the data set; and
  - responsive to determining that at least one data object exists in the at least one remaining granularity level, evaluating the at least one data object to process the spatial query with respect to the data set.

15. The non-transitory, computer-readable storage medium of claim 14, wherein the program instructions cause the one or more computing devices to further implement detecting an event for updating granularity level tracking data, and wherein the evaluating the granularity levels of the spatial index is performed in response to the detection of the event for updating the granularity level tracking data.

16. The non-transitory, computer-readable storage medium of claim 15, wherein, in detecting an event for updating granularity level tracking data, the program instructions cause the one or more computing devices to implement determining that an amount of time since the last evaluation of the spatial index to identify granularity levels exceeds a time threshold for the granularity level tracking data.

17. The non-transitory, computer-readable storage medium of claim 14, wherein the program instructions cause the one or more computing devices to further implement:
- further in response to receiving the spatial query, generating a query execution plan that includes operations to evaluate the spatial index at the identified granularity levels, wherein the evaluating of the spatial index at the identified granularity levels to process the query is performed according to the query execution plan.

18. The non-transitory, computer-readable storage medium of claim 17, wherein, in generating the query execution plan, the program instructions cause the one or more computing devices to implement generating one or more operations to scan remaining ranges of granularity levels in the spatial index not identified in the evaluating of the plurality of granularity levels for the existence of data objects.

19. The non-transitory, computer-readable storage medium of claim 18, wherein the program instructions cause the one or more computing devices to further implement:
- identifying the existence of a data object as part of the operations to scan remaining ranges;
- retrieving the data object from the data set; and
- evaluating the data object to determine whether the data object satisfies the spatial query.

20. The non-transitory, computer-readable storage medium of claim 14, wherein the evaluating the granularity levels, the receiving the spatial query, and the evaluating the spatial index are performed by a database engine implemented as part of a network-based database service, wherein the spatial query is received via a network interface for the database service, wherein the data set is stored in a network-based data storage service, wherein the database service and the data storage service are implemented as part of the same network-based services platform, and wherein the spatial query is received via a network interface for the database service.

* * * * *